United States Patent
Itoh

(10) Patent No.: US 11,811,992 B2
(45) Date of Patent: Nov. 7, 2023

(54) IMAGE PROCESSING APPARATUS, IMAGE PROCESSING METHOD, AND RECORDING MEDIUM, CONSIDERING TOP-BOTTOM DETERMINATION

(71) Applicant: Shinya Itoh, Tokyo (JP)

(72) Inventor: Shinya Itoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/654,631

(22) Filed: Mar. 14, 2022

(65) Prior Publication Data
US 2022/0311892 A1  Sep. 29, 2022

(30) Foreign Application Priority Data
Mar. 23, 2021 (JP) ................................ 2021-048174

(51) Int. Cl.
H04N 1/00 (2006.01)
G06V 30/413 (2022.01)
H04N 1/393 (2006.01)
G06V 30/40 (2022.01)

(52) U.S. Cl.
CPC ......... *H04N 1/00721* (2013.01); *G06V 30/40* (2022.01); *G06V 30/413* (2022.01); *H04N 1/393* (2013.01)

(58) Field of Classification Search
CPC .................................................. H04N 1/00721
USPC ....................................................... 358/1.18
See application file for complete search history.

(56) References Cited

U.S. PATENT DOCUMENTS

| 8,787,702 B1* | 7/2014 | Withers | G06V 30/1463 382/292 |
| 2006/0088214 A1* | 4/2006 | Handley | G06V 30/416 382/176 |
| 2006/0230004 A1* | 10/2006 | Handley | G06F 40/258 706/12 |
| 2018/0129944 A1* | 5/2018 | Meunier | G06N 7/01 |

FOREIGN PATENT DOCUMENTS

| JP | 5-217022 | 8/1993 |
| JP | 2008-017032 | 1/2008 |
| JP | 2011-008549 | 1/2011 |

OTHER PUBLICATIONS

Extended European Search Report for EP22162301.0 dated Aug. 26, 2022.
Le D X et al. "Document Image Analysis Using Integrated Image and Neural Processing" proceedings of the International conference on documentanalysis and recognition, vol. 1 (Jan. 1, 1995), pp. 327-330.

* cited by examiner

*Primary Examiner* — Jacky X Zheng
(74) *Attorney, Agent, or Firm* — IPUSA, PLLC

(57) ABSTRACT

An image processing apparatus includes circuitry to determine a type of a document based on a determination result of a character area and a non-character area in an input image of the document; select a model to be used in top-bottom determination from a plurality of models based on the type of the document; reduce the input image, to generate a reduced image; and cut out a part of the input image as a partial image. The circuitry outputs a top-bottom determination result of the input image using the selected model and one of the reduced image and the partial image corresponding to the model.

9 Claims, 7 Drawing Sheets

IMAGE PROCESSING APPARATUS, IMAGE PROCESSING METHOD, AND RECORDING MEDIUM, CONSIDERING TOP-BOTTOM DETERMINATION

CROSS-REFERENCE TO RELATED APPLICATIONS

This patent application is based on and claims priority pursuant to 35 U.S.C. § 119(a) to Japanese Patent Application No. 2021-048174, filed on Mar. 23, 2021, in the Japan Patent Office, the entire disclosure of which is hereby incorporated by reference herein.

BACKGROUND

Technical Field

The present disclosure relates to image processing, and, more particularly, to an image processing apparatus, an image processing method, and a recording medium.

Related Art

When a document is read by a scanner, there is a case where the document is read upside down or in a wrong orientation different from a document orientation (for example, horizontally with respect to a vertical document). Conventionally, there is known a technology of automatically detecting a top-bottom direction of the document read in the wrong orientation and correcting the orientation, which is called top-bottom detection, up-down orientation correction, or document orientation detection (hereinafter, collectively referred to as top-bottom detection). An optical character recognition (OCR) technology may be used for top-bottom determination.

SUMMARY

An embodiment provides an image processing apparatus that includes circuitry to determine a type of a document based on a determination result of a character area and a non-character area in an input image of the document; select a model to be used in top-bottom determination from a plurality of models based on the type of the document; reduce the input image, to generate a reduced image; and cut out a part of the input image as a partial image. The circuitry outputs a top-bottom determination result of the input image using the selected model and one of the reduced image and the partial image corresponding to the model.

Another embodiment provides an image processing method that includes determining a type of a document based on a determination result of a character area and a non-character area in an input image of the document, selecting a model to be used in top-bottom determination from a plurality of models based on the type of the document, and outputting a top-bottom determination result of the input image using the selected model and one of a reduced image and a partial image corresponding to the model. The reduced image is reduced from the input image, and the partial image is cut out from the input image.

Yet another embodiment provides a non-transitory recording medium storing a plurality of program codes which, when executed by one or more processors, causes the processors to perform the method described above.

BRIEF DESCRIPTION OF SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
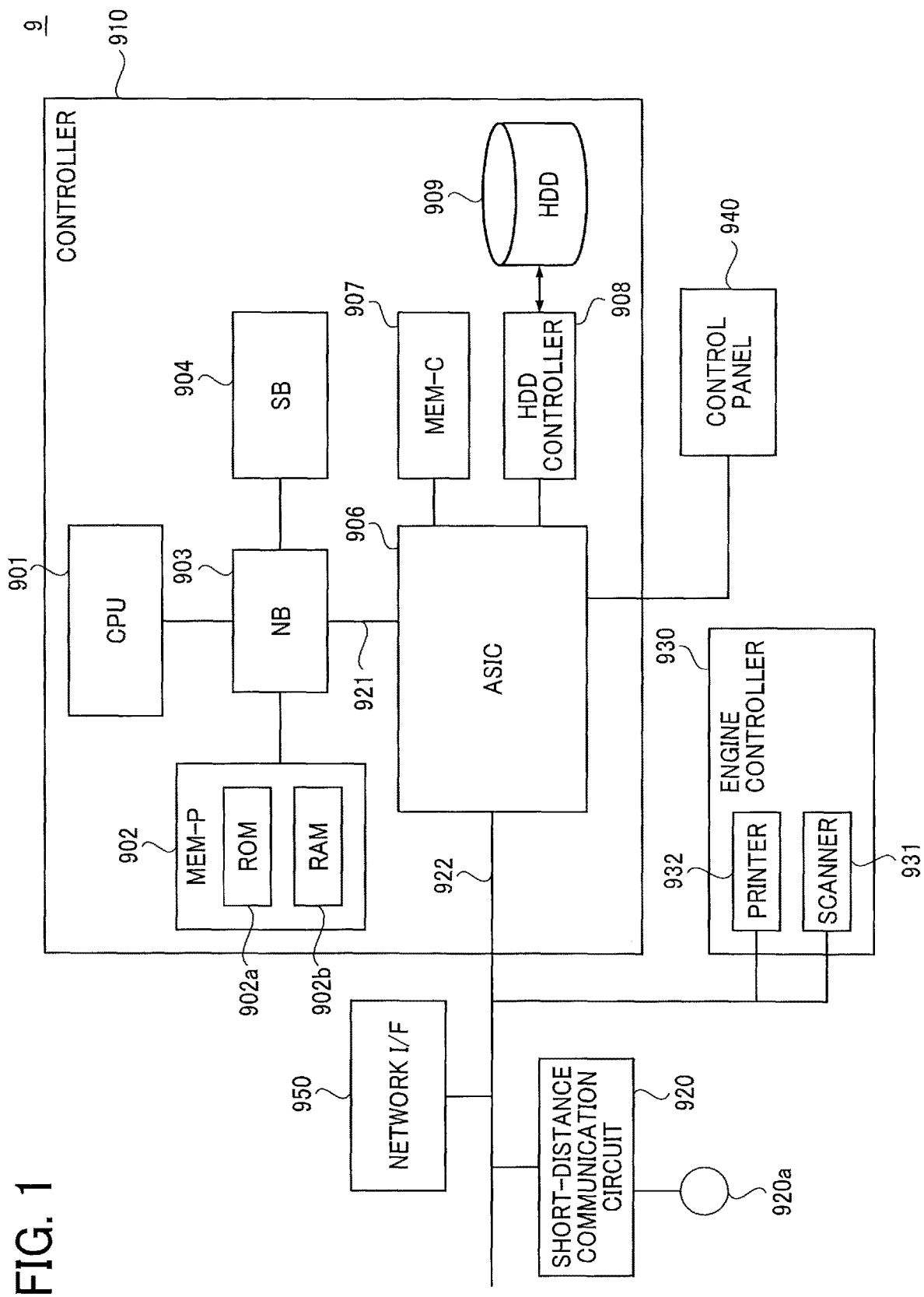
FIG. 1 is a diagram illustrating a hardware configuration of an image forming apparatus (e.g., a multifunction peripheral), as an example of an image processing apparatus according to one embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTIONS OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are hereinafter described, but the embodiments of the present disclosure are not limited to the embodiments hereinafter described. In the embodiments hereinafter described, as an example of an image processing apparatus, a description is given of an image forming apparatus having an image reading function and an image forming function.

FIG. 1 is a block diagram illustrating a hardware configuration of a multifunction peripheral/product/printer (MFP) as the image forming apparatus (also an example of the image processing apparatus) according to this embodiment. As illustrated in FIG. 1, an MFP 9 is provided with a controller 910, a short-range communication circuit 920, an engine controller 930, a control panel 940, and a network interface (I/F) 950.

The controller 910 includes a central processing unit (CPU) 901, which is a main part of a computer, a system memory (MEM-P) 902, a north bridge (NB) 903, a south bridge (SB) 904, an application specific integrated circuit (ASIC) 906, a local memory (MEM-C) 907, which is a memory, a hard disk drive (HDD) controller 908, and a hard disk drive (HDD) 909, which is a storage, and the NB 903 is connected to the ASIC 906 by an accelerated graphics port (AGP) bus 921.

The CPU 901 is a controller that generally controls the MFP 9. The NB 903 is a bridge for connecting the CPU 901 to the MEM-P 902, the SB 904, and the AGP bus 921, and includes a memory controller that controls reading and writing from and to the MEM-P 902, a peripheral component interconnect (PCI) master, and an AGP target.

The MEM-P 902 includes a read only memory (ROM) 902a, which is a memory for storing programs and data for implementing each function of the controller 910, and a random access memory (RAM) 902b, in which the programs and data are expanded, used as a drawing memory and the like at the time of memory printing. The program stored in the RAM 902b may be recorded in a computer-readable recording medium such as a compact disc-read only memory (CD-ROM), a compact disc-recordable (CD-R), and a digital versatile disc (DVD) as a file in an installable format or an executable format to be provided.

The SB 904 is a bridge for connecting the NB 903 to a PCI device and a peripheral device. The ASIC 906 is an integrated circuit (IC) for image processing application including a hardware element for image processing, and serves as a bridge that connects the AGP bus 921, a PCI bus 922, the HDD controller 908, and the MEM-C 907 to each other. The ASIC 906 includes a PCI target, an AGP master, an arbiter (ARB) that serves as a core of the ASIC 906, a memory controller that controls the MEM-C 907, a plurality of direct memory access controllers (DMACs) that rotates image data by hardware logic and the like, and a PCI unit. The PCI unit transfers data between a scanner 931 and a printer 932 via the PCI bus 922. To the ASIC 906, a universal serial bus (USB) interface or an Institute of Electrical and Electronics Engineers 1394 (IEEE 1394) interface may be connected.

The MEM-C 907 is the local memory used as a copy image buffer and a code buffer. The HDD 909 is a storage for image data, font data used at the time of printing, and forms. The HDD controller 908 controls reading or writing of data from or to the HDD 909 under the control of the CPU 901. The AGP bus 921 is a bus interface for a graphics accelerator card proposed for speeding up graphics processing, and may directly access the MEM-P 902 with high throughput to speed up the graphics accelerator card.

The short-range communication circuit 920 is provided with an antenna 920a. The short-range communication circuit 920 is a communication circuit such as near field communication (NFC) and BLUETOOTH The engine controller 930 includes the scanner 931 and the printer 932. The control panel 940 is provided with a panel display 940a such as a touch panel that displays a current set value, a selection screen and the like and receives an input from an operator, and a control panel 940b including a numeric keypad that receives a set value of a condition regarding image formation such as a density setting condition, a start key that receives a copy start instruction and the like. The controller 910 generally controls the MFP 9, and controls, for example, drawing, communication, an input from the control panel 940 and the like. The scanner 931 or the printer 932 includes an image processing unit for error diffusion, gamma conversion, and the like.

The MFP 9 may sequentially switch to select a document server function, a copy function, a printer function, and a facsimile function by an application switching key of the control panel 940. When the document server function is selected, a document server mode is set, when the copy function is selected, a copy mode is set, when the printer function is selected, a printer mode is set, and when the facsimile mode is selected, a facsimile mode is set.

The network I/F 950 is an interface for performing data communication using a communication network. The short-range communication circuit 920 and the network I/F 950 are electrically connected to the ASIC 906 via the PCI bus 922.

Figure 2:
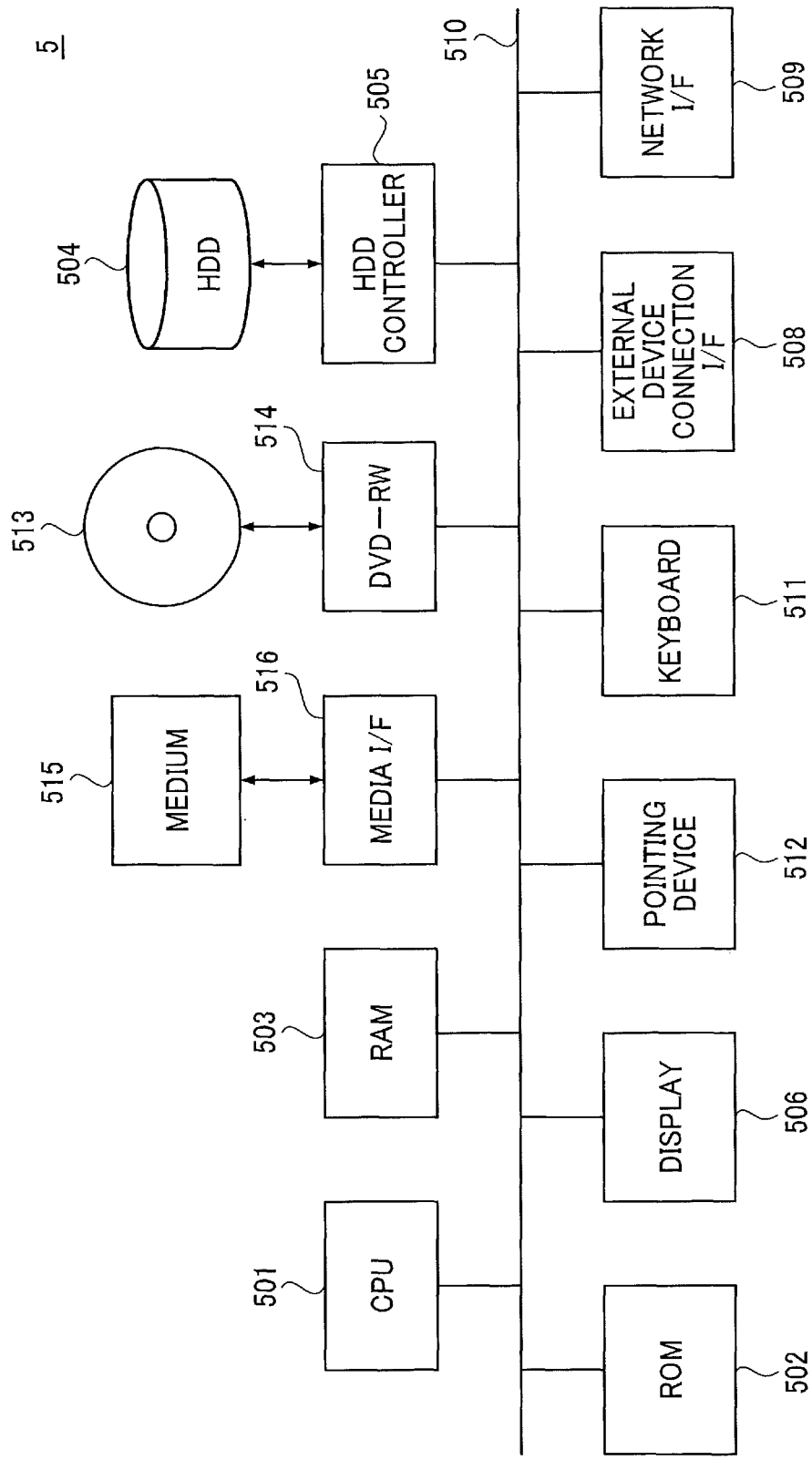
FIG. 2 is a diagram illustrating a hardware configuration of a computer that is an image processing apparatus according to another embodiment.

FIG. 2 is a block diagram illustrating a hardware configuration of a computer as an image processing apparatus according to another embodiment. FIG. 2 is the block diagram illustrating a hardware configuration of a server. Alternatively, the computer as the image processing apparatus according to one embodiment may be a personal computer. Herein, a hardware configuration of a server 5 is described.

As illustrated in FIG. 2, the server 5 is implemented by a computer. The server 5 include a CPU 501, a ROM 502, a RAM 503, a hard disk drive (HDD) 504, a hard disk drive (HDD) controller 505, a display 506, an external device connection I/F 508, a network I/F 509, a data bus 510, a keyboard 511, a pointing device 512, a digital versatile disk-rewritable (DVD-RW) drive 514, and a media I/F 516 as illustrated in FIG. 2.

The CPU 501 controls the entire operation of the server 5. The ROM 502 stores a program used for driving the CPU 501 such as an initial program loader (IPL). The RAM 503 is used as a work area of the CPU 501. The HDD 504 stores various data such as programs. The HDD controller 505 controls reading or writing of various data from and to the HDD 504 under the control of the CPU 501. The display 506 displays various types of information such as a cursor, a menu, a window, characters, or an image. The external device connection I/F 508 is an interface for connecting various external devices. In this case, the external device is, for example, a universal serial bus (USB) memory, a printer or the like. The network I/F 509 is an interface for performing data communication using the communication network. The data bus 510 is an address bus, a data bus and the like for electrically connecting the respective components such as the CPU 501 illustrated in FIG. 2.

The keyboard 511 is a kind of input device including a plurality of keys for inputting a character, a numerical value, various instructions, and the like. The pointing device 512 is a kind of input device that selects and executes various instructions, selects a processing target, and moves a cursor. The DVD-RW drive 514 controls reading or writing of various data from or to a DVD-RW 513 as an example of a detachable recording medium. It is not limited to the DVD-RW, and may be a digital versatile disk-recordable (DVD-R) and the like. The media I/F 516 controls reading or writing (storage) of data from or to a recording medium 515 such as a flash memory.

The server 5 illustrated in FIG. 2 may be an apparatus that transmits a top-bottom determination result of a read image received from the MFP or a result of image correction based on the top-bottom determination result to the MFP, for example, as a cloud service. Alternatively, this may also be used as an apparatus that obtains the top-bottom determination result of the stored read image or the result of the image correction based on the top-bottom determination result on a desktop with a configuration similar to that of the server 5.

Figure 3:
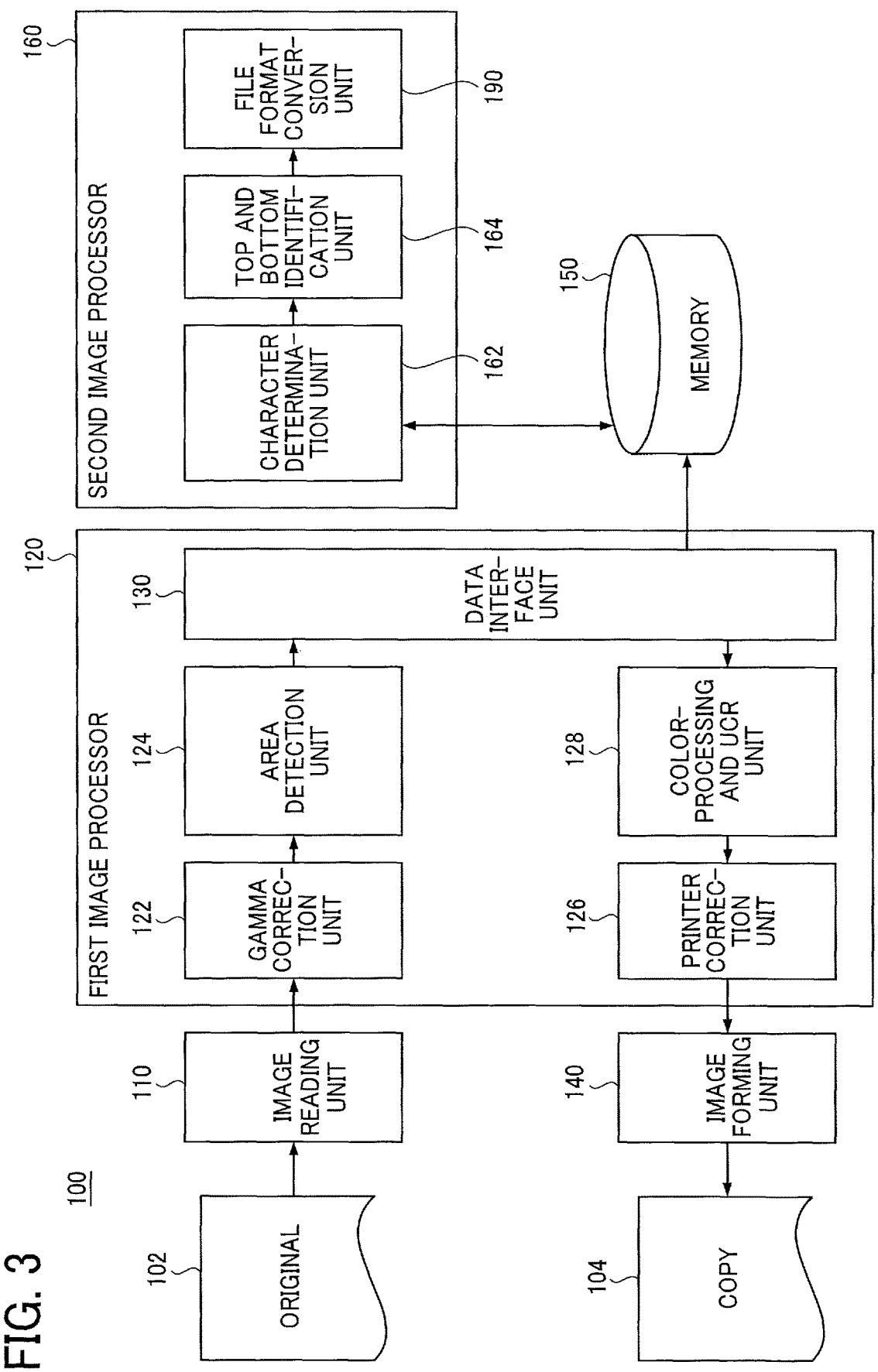
FIG. 3 is a block diagram illustrating a schematic configuration of the image forming apparatus as the image processing apparatus according to one embodiment.

FIG. 3 is a block diagram illustrating a schematic configuration of an image forming apparatus as an example of the image processing apparatus according to this embodiment. Functional units in FIG. 3 are implemented by the hardware resources illustrated in FIG. 1. An image forming apparatus 100 illustrated in FIG. 3 includes an image reading unit 110, a first image processor 120, an image forming unit 140, a memory 150, and a second image processor 160. The block diagram illustrated in FIG. 3 corresponds to the image forming apparatus having the image reading function and the image forming function as illustrated in FIG. 1.

The image reading unit 110 reads image data from a document 102. The image reading unit 110 corresponds to the scanner 931 illustrated in FIG. 1. The image reading unit 110 transfers read image data to the first image processor 120. The image forming unit 140 transfers the image data output from the first image processor 120 to a transfer member and outputs a copy 104. The image forming unit 140 is a transfer printing unit and corresponds to the printer 932 illustrated in FIG. 1. Hereinafter, a processing flow to obtain a copy image is also described referring to FIG. 3. The first image processor 120 includes a gamma correction unit 122, an area detection unit 124, a printer correction unit 126, a color-processing and under color removal (UCR) unit 128, and a data interface unit 130.

The gamma correction unit 122 performs one-dimensional conversion on a signal in order to adjust a gradation balance for each color in the data read by the image reading unit 110 (for example, eight bits for each of red-green-blue (RGB) after analog/digital (A/D) conversion). Here, for the sake of description, the signal is a density linear signal (RGB signal: a signal value indicating white is set to 0) after the conversion. An output of the gamma correction unit 122 is transferred to the area detection unit 124 and the data interface unit 130.

The area detection unit 124 determines whether a pixel of interest or a pixel block of interest in the read image is a character area or a non-character area (that is, a pixel or area corresponding to a photograph, a picture, and the like). The area detection unit 124 may determine whether a color is a chromatic color or an achromatic color. The color-processing and UCR unit 128 performs color reproduction processing suitable for the document according to a result of the color determination.

The data interface unit 130 is a storage device management interface to temporarily store the determination result from the area detection unit 124 and gamma corrected image data in the memory 150.

In contrast, the gamma corrected image data and the determination result from the area detection unit 124 are transferred from the data interface unit 130 to the color-processing and UCR unit 128. The color-processing and UCR unit 128 selects color processing and UCR processing based on the determination result for each pixel or pixel block. The printer correction unit 126 receives cyan (C), magenta (M), yellow (Y), and black (Bk) image signals from the color-processing and UCR unit 128, performs gamma correction processing and dither processing thereon in consideration of printer characteristics, and transfers them to the image forming unit 140.

The second image processor 160 receives the image data after gamma correction temporarily stored in the memory 150, and performs top-bottom determination of the image data. The second image processor 160 then converts the image data into a predetermined file format, such as portable document format (PDF) and Office Open Extensible Markup Language (XML) document format, using a result obtained by the top-bottom determination.

More specifically, the second image processor 160 includes a character determination unit 162, a top-bottom determination unit 164, and a file format conversion unit 190.

The character determination unit 162 applies character determination processing to the gamma corrected image data. The character determination unit 162 performs the character determination processing similar to that performed by the area detection unit 124 of the first image processor 120, determines the character area and the non-character area in the input image, and generates a determination result. More specifically, the character determination unit 162 determines whether each of the pixel of interest or the pixel block of interest in the read image is the character area or the non-character area. The gamma corrected image data and a result of the character determination processing (hereinafter, referred to as a character determination processing result) are output to the top-bottom determination unit 164.

Based on the character determination processing result output from the character determination unit 162, the top-bottom determination unit 164 discriminates a document type, for example, from a ratio of character pixels and features of the non-character area, and performs preprocessing associated with the document type to the gamma corrected image data. The top-bottom determination unit 164 then inputs preprocessed image data to an inference model similarly associated with the document type, and performs the top-bottom determination of the document. A top-bottom determination result obtained by the top-bottom determination unit 164 is output to the file format conversion unit 190.

The file format conversion unit 190 converts into a predetermined file format such as PDF or Office Open XML (OOXML) format using the top-bottom determination result output from the top-bottom determination unit 164. For example, the top-bottom determination result is used to rotate the data rightward or leftward according to the orientation of the document of each page, so as to adjust the direction of a series of documents.

In the described embodiment, the character determination processing used in the top-bottom determination by the top-bottom determination unit 164 is described to be calculated by the character determination unit 162 of the second image processor 160. However, as described above, there is a case where the area detection unit 124 of the first image processor 120 also has a function of performing character determination. In this case, the character determination processing result by the area detection unit 124 may be acquired from the first image processor 120. This configuration dispenses with the character determination unit 162 in the second image processor 160.

In the embodiment illustrated in FIG. 3, functional units are described to be distributed to the first image processor 120 and the second image processor 160. Alternatively, the functional units may be collectively formed on a single apparatus, or the functional units provided in the first image processor 120 and the functional units provided in the second image processor 160 may be further distributed to a plurality of apparatuses, and there is no particular limitation.

Figure 4:
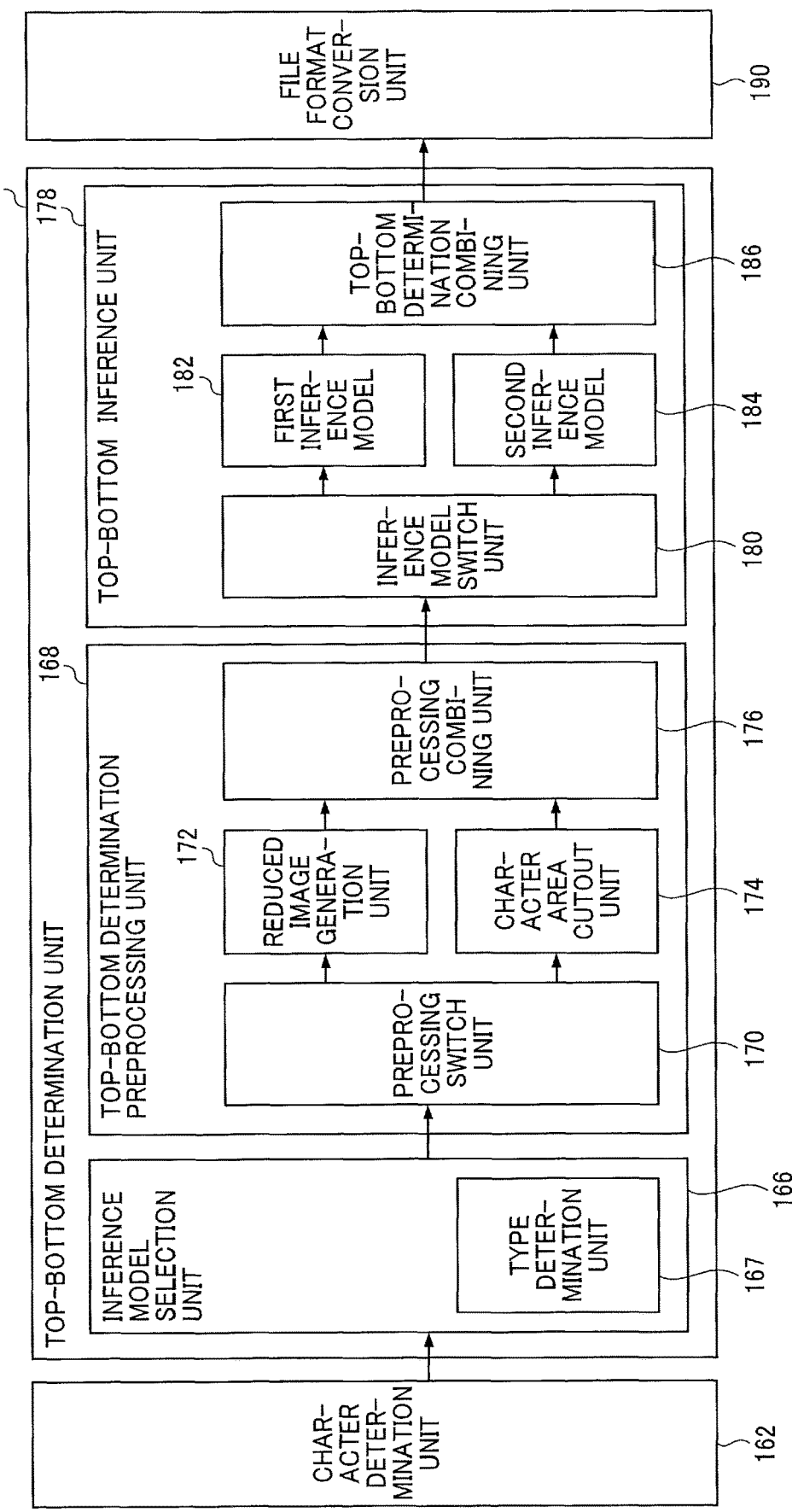
FIG. 4 is a block diagram illustrating a top-bottom determination unit in the image forming apparatus as the image processing apparatus according to one embodiment.

FIG. 4 is a detailed block diagram of the top-bottom determination unit 164 in the image forming apparatus as the image processing apparatus according to this embodiment. As illustrated in FIG. 4, the top-bottom determination unit 164 includes an inference model selection unit 166, a top-bottom determination preprocessing unit 168, and a top-bottom inference unit 178.

The image data from the memory 150 illustrated in FIG. 3 and the character determination processing result for the image data from the character determination unit 162 are input to the top-bottom determination unit 164. The inference model selection unit 166 includes a type determination unit 167 that determines the type of the document based on the character determination processing result of the character area and the non-character area in the input image data. More specifically, the type determination unit 167 discriminates the type of the document (document type such as a photograph document and a text document) from a ratio (rate) of the character area in the entire image and a feature amount of the image in the non-character area based on the character determination processing result for the image data from the character determination unit 162. Based on the determined type of the document, the inference model selection unit 166 selects the inference model used when inferring at the time of the top-bottom determination associated in advance with the type.

The number of types of the document types and the number of types of the inference models at that time are not limited in particular, and may be any number not smaller than two. Hereinafter, it is continuously described assuming that two inference models are prepared. The image data from the memory 150, information identifying the inference model selected by the inference model selection unit 166 (hereinafter, referred to as inference model information), and the character determination processing result for the image data by the character determination unit 162 illustrated in FIG. 3 are input to the top-bottom determination preprocessing unit 168.

The top-bottom determination preprocessing unit 168 applies the preprocessing based on the inference model information selected by the inference model selection unit 166. As an example of the preprocessing, as for a first inference model to be applied to a document with few characters such as a photograph, reduction processing is applied to the image data of each document from the memory 150, to reduce the size of the entire document. A reduced image of the entire document as a result of the reduction processing is preprocessed image data in a case where the first inference model is selected. In the reduction processing, any reduction algorithm such as nearest neighbor interpolation or linear interpolation (bilinear) may be used, but it is not limited thereto. In contrast, as for a second inference model to be applied to a document with many characters (particularly, characters of a small character size) such as an office document and a paper, a character area is calculated based on the character determination processing result for the image data by the character determination unit 162, and a rectangular area including the character is cut out for the image data from the memory 150. A partial image of the character area of the document as a cutout result is the preprocessed image data in a case where the second inference model is selected.

The inference model information selected by the inference model selection unit 166 and a result (preprocessed image data) obtained by applying the preprocessing based on the inference model information by the top-bottom determination preprocessing unit 168 are input to the top-bottom inference unit 178.

The top-bottom inference unit 178 inputs the result (preprocessed image data) obtained by applying the preprocessing output from the top-bottom determination preprocessing unit 168 to the inference model in a switching manner with reference to the inference model information selected by the inference model selection unit 166, performs the inference of the top-bottom determination, and outputs the top-bottom determination result. The top-bottom determination result indicates any of north/east/west/south. The top-bottom determination result output from the top-bottom inference unit 178 is input to the file format conversion unit 190, and processing according to the top-bottom determination result is executed by the file format conversion unit 190.

FIG. 4 further illustrates a more detailed functional configuration of the top-bottom determination preprocessing unit 168. As illustrated in FIG. 4, the top-bottom determination preprocessing unit 168 includes a preprocessing switch unit 170, a reduced image generation unit 172, a character area cutout unit 174, and a preprocessing combining unit 176.

The image data input from the memory 150, the inference model information selected by the inference model selection unit 166, and the character determination processing result for the image data by the character determination unit 162 are input to the top-bottom determination preprocessing unit 168.

The preprocessing switch unit 170 receives, as inputs, the image data from the memory 150, the inference model information selected by the inference model selection unit 166, and the character determination processing result for the image data from the character determination unit 162. The preprocessing switch unit 170 switches the preprocessing for each unit image input, for example, for each page of the document, with reference to the inference model information that is one of the inputs.

Specifically, the preprocessing in a case where the first inference model is selected by the inference model selection unit 166 in FIG. 4 is the reduction processing for the entire document. The image data input from the memory 150 and the inference model information selected by the inference model selection unit 166 are input to the reduced image generation unit 172. In contrast, the preprocessing in a case where the second inference model is selected by the inference model selection unit 166 is processing of calculating the character area and cutting out the rectangular area including the character. The image data input from the memory 150, the inference model information selected by the inference model selection unit 166, and the character determination processing result for the image data by the character determination unit 162 are input to the character area cutout unit 174.

In a specific embodiment, selection as to which one of the reduced image generation unit 172 and the character area cutout unit 174 is used in the top-bottom determination preprocessing unit 168 is performed in units of image data of a document, and this selection is exclusive in one image data (one page) of a document. That is, in this specific embodiment, not both the reduced image generation unit 172 and the character area cutout unit 174 are simultaneously selected.

The reduced image generation unit 172 applies the reduction processing to the image data from the memory 150. In the reduction processing, nearest neighbor interpolation or linear interpolation (bilinear) may be adopted; the reduction algorithm to be adopted is not limited. It is not limited whether to maintain an aspect ratio of the image before and after the reduction (unity magnification) or ignore the same (scaling) when reducing the image. The image data reduced by the reduced image generation unit 172 (preprocessed image data) and the inference model information selected by the inference model selection unit 166 are input to the preprocessing combining unit 176.

The character area cutout unit 174 selects a character area (character pixel group) at any position based on the character determination processing result for the image data by the character determination unit 162, and cuts out (crops) an area of the image data corresponding to the selected character area. The image data (preprocessed image data) cut out by the character area cutout unit 174 and the inference model information selected by the inference model selection unit 166 are input to the preprocessing combining unit 176.

The reduced image generation unit 172 is described as generating the reduced image obtained by reducing the entire input image, and the character area cutout unit 174 is described as cutting out a part of the image without reducing the same. Such a configuration is preferable but it is not limited to such configuration. It may be said that, as long as the reduced image generation unit 172 reduces the image of an area larger than a portion cut out by the character area cutout unit 174, this includes generating an image obtained by reducing not an entire image but a part of the input image, and performs the preprocessing so as to prioritize the reduction. In contrast, it may be said that, as long as the character area cutout unit 174 cuts out an area smaller than the original image reduced by the reduced image generation unit 172, this performs the preprocessing so as to prioritize the cutout of a part of the image without excluding the reduction.

The preprocessing combining unit 176 provides the inference model information selected by the inference model selection unit 166 to the preprocessed image data (reduced image data generated by the reduced image generation unit 172 or partial image data cut out by the character area cutout unit 174). The preprocessing combining unit 176 serves as an interface that connects the top-bottom determination preprocessing unit 168 to the top-bottom inference unit 178 in FIG. 4.

FIG. 4 further illustrates a more detailed functional configuration of the top-bottom inference unit 178. As illustrated in FIG. 4, the top-bottom inference unit 178 includes an inference model switch unit 180, a first inference model 182, a second inference model 184, and a top-bottom determination combining unit 186.

The preprocessed image data (the reduced image data generated by the reduced image generation unit 172 or the partial image data cut out by the character area cutout unit 174) and the inference model information selected by the inference model selection unit 166 are input to the top-bottom inference unit 178.

The inference model switch unit 180 receives the preprocessed image data and the inference model information as inputs. The inference model switch unit 180 switches the inference model to which the preprocessed image data is input for each document with reference to the inference model information.

The first inference model 182 is the inference model to be applied to the document with few characters such as a photograph. In a specific embodiment, the first inference model 182 is the inference model trained on the assumption that an image obtained by reducing an entire scan image is input. Training data of the first inference model 182 includes an image with few characters such as a photograph and a correct answer label indicating a top-bottom direction of the image, and training by an appropriate machine learning technology such as supervised learning may be performed.

The second inference model 184 is the inference model to be applied to the document with many characters (particularly, characters of a small character size) such as an office document or a paper. The second inference model 184 is the inference model trained on the assumption that an image obtained by cutting out an area including many character portions of the scan image with a specific size is input. Training data of the second inference model 184 includes an image including many character portions and a correct answer label indicating the top-bottom direction of the image, and training by an appropriate machine learning technology and the like may be performed.

The first inference model 182 and the second inference model 184 may be machine learning models as so-called classifiers. In a preferred embodiment, each of the first inference model 182 and the second inference model 184 may be a neural network model and the like trained by deep learning. The first inference model 182 and the second inference model 184 are not limited to the models based on the deep learning. For example, the second inference model may be an existing technology that determines the top and bottom of the document based on OCR.

The top-bottom determination combining unit 186 integrates results of inference of the top-bottom determination by the first inference model 182 and the second inference model 184, and inputs the same to the file format conversion unit 190. That is, the top-bottom determination combining unit 186 serves as an interface that connects the top-bottom inference unit 178 to the file format conversion unit 190.

In the description so far, the selection of the reduced image generation unit 172 and the character area cutout unit 174 in the top-bottom determination preprocessing unit 168 and the selection of the inference model to be used are exclusive. However, in another embodiment, the selection of the inference model and the selection of the preprocessing are not necessarily exclusive.

For example, the preprocessing and inference of a plurality of inference models may be performed in parallel, inference results are obtained as primary results, and a final result id determined based of the determined document type and a plurality of primary inference results. Specifically, the top-bottom determination may be executed by a plurality of inference models and a plurality of pieces of corresponding preprocessing, and the obtained top-bottom determination primary results maybe weighted-evaluated according to the document type.

For example, since a certainty factor of a classification result may be calculated in general for the classification result by the classifier, reliability of the results obtained from the plurality of inference models may be subjected to the weighted evaluation according to the document type, and the top-bottom determination primary result with high reliability after the weighting is adopted, so that the final top-bottom determination result may be obtained. That is, in one or a plurality of embodiments, the inference model selection unit 166 selects at least an inference model to be used preferentially out of a plurality of inference models based on the determined document type. In a specific embodiment, the inference model selection unit 166 selects an inference model to be exclusively used out of a plurality of models based on the determined document type. In another specific embodiment, the inference model selection unit 166 selects an inference model to be used with the largest weight out of a plurality of models based on the determined document type.

Figure 5:
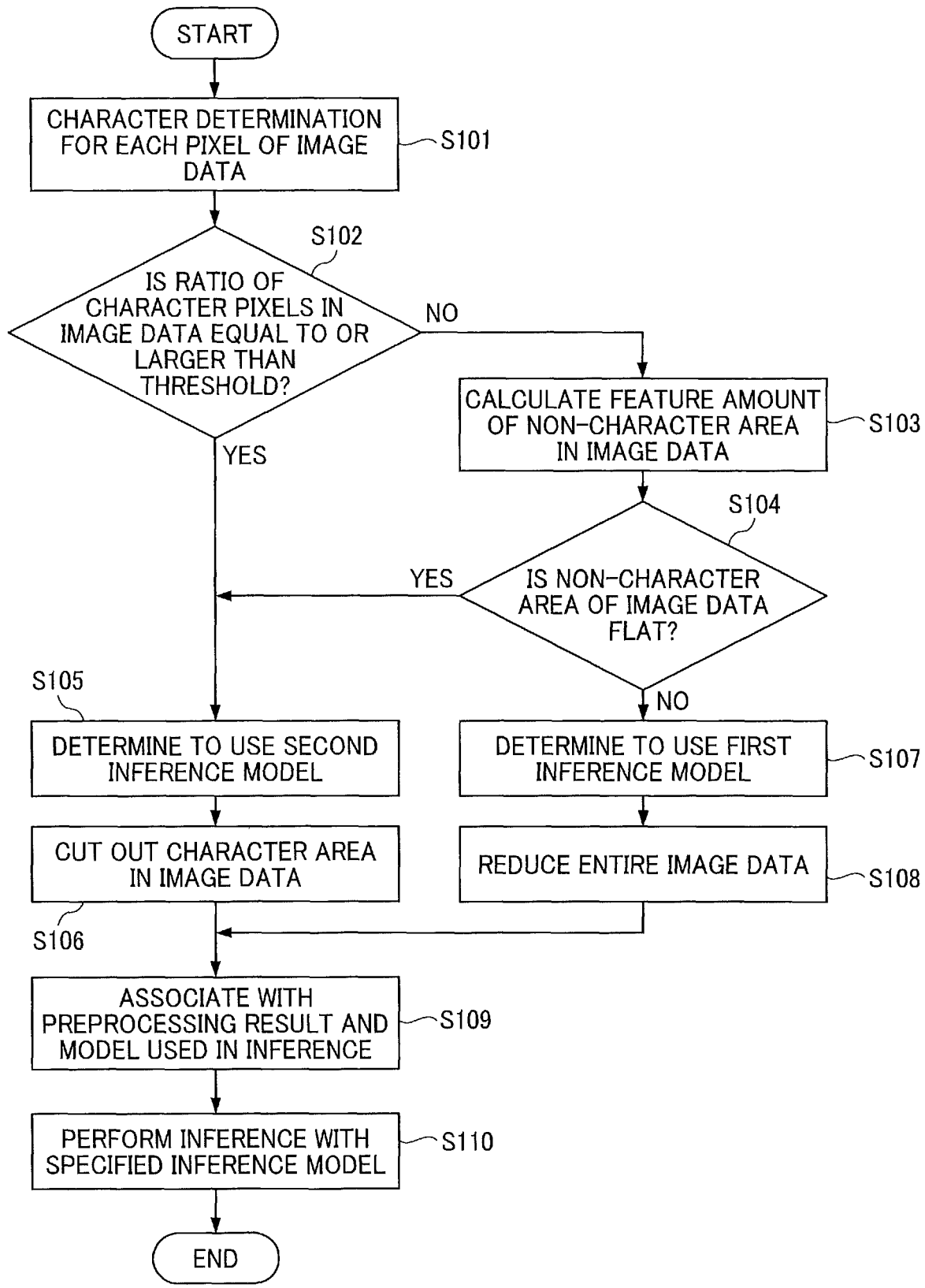
FIG. 5 is a flowchart illustrating top-bottom determination processing performed by the mage forming apparatus, as an example of the image processing apparatus according to one embodiment.

Hereinafter, the top-bottom determination processing according to this embodiment is described referring to FIG. 5. FIG. 5 is a flowchart illustrating the top-bottom determination processing executed by the image processing apparatus according to this embodiment. The processing illustrated in FIG. 5 is executed by a processor (e.g., the second image processor 160) that implements the character determination unit 162 and the top-bottom determination unit 164 per image data of one document page.

The processing illustrated in FIG. 5 starts in response to an input of the image data from the memory 150 to the second image processor 160.

At step S101, the character determination unit 162 performs the character determination processing on the image data. In the character determination processing, for each pixel or pixel block, whether the pixel or pixel block is the character area or the non-character area is determined, and the character determination processing result is obtained.

At step S102, the inference model selection unit 166 determines whether the ratio (rate) of the character pixels in the image data is equal to or larger than a threshold set in advance based on the character determination processing result for the image data. The threshold as a predetermined condition is stored in a memory, for example, by a manufacturer based on empirical data. In a case where it is determined at step S102 that the ratio of the character pixels of the image data is smaller than the threshold set in advance (NO), the processing branches to step S103.

At step S103, the inference model selection unit 166 calculates the image feature amount of the non-character area in the image data. In one or a plurality of embodiments, the image feature amount to be calculated is not particular limit, and may be a statistical feature amount such as variance of pixel values in the non-character area of the image data.

Here, the variance may be obtained by a difference between the root mean square and the square of mean of the pixel values in a predetermined range (herein, the entire non-character area), and the variance is an index value of a pixel value dispersion degree.

At step S104, the inference model selection unit 166 determines whether the non-character area of the image data is flat based on the image feature amount calculated at step S103. In a case where the variance is smaller than a predetermined threshold, it is determined as being flat. In a case where it is determined as flat (YES) at step S104, the processing branches to step S105.

With reference to step S102 again, in a case where it is determined at step S102 that the ratio of the character pixels in the image data is equal to or larger than the threshold set in advance (YES), the processing also branches to step S105. In contrast, in a case where it is determined at step S104 that the non-character area of the image data is not flat (NO), the processing branches to step S107.

A manner of branching is summarized in following Table 1. In following Table 1, in a case of YES in the determination at step S102, the documents are further divided into different types (text document with flat background and character photograph document) according to whether the determination at step S104 is YES or NO. However, from the viewpoint that the preprocessing and inference model to be used are determined regardless of the determination at step S104, the documents may be considered to be of same type. Alternatively, the document type may be further classified into a plurality of document types associated with the same preprocessing and inference model.

TABLE 1

| Determination At Step S102: Is Ratio Of Character Pixels Equal To Or Larger Than Threshold? | Determination At Step S104: Is Non-Character Area Flat? | Next Processing |
|---|---|---|
| YES | YES | Steps S105, S106 (Determined To Be Document Original With Flat Background) |
| YES | NO | Steps S105, S106 (Determined To Be Character Photograph Original) |
| NO | NO | Steps S107, S108 (Determined To Be Photograph Original) |
| NO | YES | Steps S105, S106 (Determined To Be Original With Flat Background But Partially With Character) |

At step S105, the inference model selection unit 166 determines to use the second inference model 184, and adds, to the image data, the inference model information indicating use of the second inference model 184.

At step S106, according to the inference model information indicating the second inference model 184, the character area cutout unit 174 selects a character area (character pixel group) based on the character determination processing result of the image data, cuts out (crops) image data corresponding to the selected character area, and generates partial image data. The character area may be selected at any position. The size of image data thus cut out is the image size input to the second inference model 184.

In contrast, at step S107, the inference model selection unit 166 determines to use the first inference model 182, and adds, to the image data, the inference model information indicating use of the first inference model 182.

At step S108, according to the inference model information indicating the first inference model 182, the reduced image generation unit 172 performs reduction processing on the image data, and generates the reduced image data of the entire image. In scaling down processing at that time, any reduction algorithm such as nearest neighbor interpolation and linear interpolation (bilinear) may be adopted. When reducing the image, whether to maintain the aspect ratio of the image before and after the reduction or ignore is not limited. The size after the reduction is the image size input to the first inference model 182.

When the processing at step S105 or S108 ends, the procedure shifts to step S109. At step S109, the preprocessing combining unit 176 adds the information of the inference model to be used in subsequent S110 to the character area of the partial image data cut out at step S106 or the reduced image data (referred to as the preprocessed image data) generated at S108. More specifically, information indicating use of the first inference model 182 is added to the reduced image data generated at S108, and information indicating use of the second inference model 184 is added to the cutout image generated at S105. When the processing at S109 ends, the procedure shifts to S110.

At step S110, the top-bottom inference unit 178 inputs the preprocessed image data to the corresponding inference model to perform inference based on the information indicating the model used in inference, provided at step S109. Specifically, the reduced image generated by the processing at S108 is input to the first inference model 182, and the partial image data of the character area cut out by the processing at S106 is input to the second inference model 184. The inference result (top-bottom determination result) is any of north, east, west, and south. In the described embodiment, the inference results are classified into any of four directions as the top-bottom direction, and four orientations are sufficient for the top-bottom determination; however, the number of classifications is not particularly limited.

When the processing at step S110 ends, the processing as the character determination unit 162 and the top-bottom determination unit 164 ends.

Figure 6A:
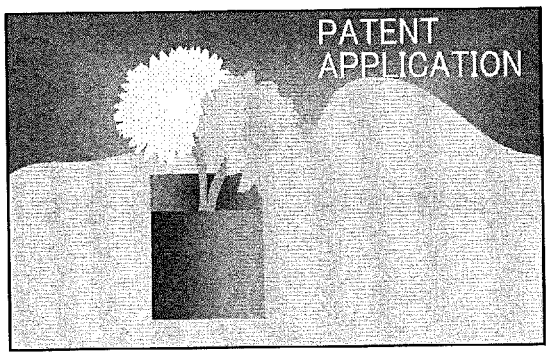
FIGS. 6A to 6D are diagrams illustrating determination as to whether a ratio of character pixels of image data is equal to or larger than a threshold and determination as to whether a non-character area of the image data is flat, according to one embodiment.
Figure 6B:
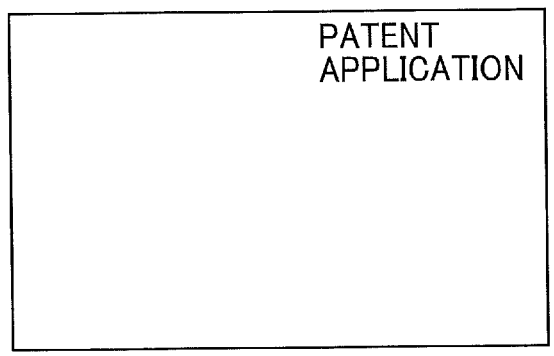
Figure 6C:
Figure 6D:
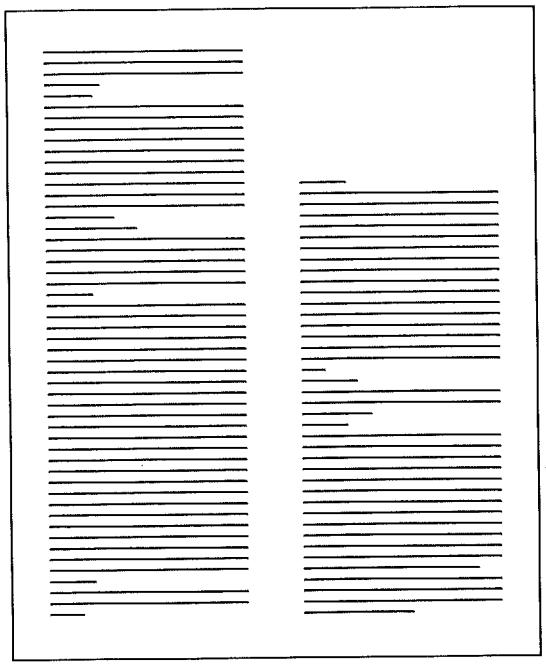

FIGS. 6A to 6D illustrate determination as to whether the ratio of the character pixels of the image data is equal to or larger than a threshold performed at step S102 and determination as to whether the non-character area of the image data is flat performed at S104. In FIGS. 6A to 6D, a black frame is attached to the image for convenience of description, but it goes without saying that a target image is without the black frame. In FIGS. 6C and 6D, rows of characters are schematically represented by parallel lines.

First, a description is given of a document with few characters such as a photograph to which the first inference model is applied. Here, it is assumed that an input image as illustrated in FIG. 6A is given. A result of performing the character determination processing on the image data illustrated in FIG. 6A is a binary image as illustrated in FIG. 6B. In FIG. 6B, black pixels represent pixels belonging to the character area, and white pixels represent pixels belonging to the non-character area. For example, in a case where the processing of the second image processor 160 is to be performed on the input image in which a photograph (or picture) occupies most of the entire image as illustrated in FIG. 6A, the character determination unit 162 outputs the character determination processing result of the binary image as illustrated in FIG. 6B (processing at S101).

When the result of FIG. 6B is input to the top-bottom determination unit 164, processing by the inference model selection unit 166 (processing at S102 to S104) is performed. At step S102, the inference model selection unit 166 counts character pixels in the character determination processing result illustrated in FIG. 6B, and determines whether the ratio of the counted number of character pixels to the number of pixels of the entire image is equal to or larger than a threshold set in advance. Here, for convenience of description, the threshold is set to 50%. In a case of the input image as illustrated in FIG. 6A, the photograph occupies most of the entire image. Accordingly, in the character determination processing result as illustrated in FIG. 6B, the ratio of the character pixels in the entire image is small and the number of character pixels is also small (here, for the sake of description, the number of character pixels is 500 with respect to the number of pixels of 10,000 in the entire image). In a case of FIG. 6A, since the number of character pixels (500 pixels with respect to 10,000 pixels, so that 5%) is smaller than the threshold (50%), a determination result of the processing at S102 is NO.

In a case where the determination result of NO is obtained in the processing at step S102, the processing at steps S103 and S104 is performed. At steps S103 and S104 of the inference model selection unit 166, it is determined whether the non-character area is flat for the character determination processing result as illustrated in FIG. 6B. The inference model selection unit 166 determines whether the non-character area is flat from the variance calculated from the non-character area of the input image illustrated in FIG. 6A corresponding to non-character pixels of the binary image illustrated in FIG. 6B. In a case of the input image as illustrated in FIG. 6A, since the area corresponding to the non-character pixels in FIG. 6B is a photograph portion, the non-character area is not flat, and a determination result of the processing at step S104 is NO. As described above, in a case where it is determined to be NO in the processing at step S102 and it is determined to be NO in the processing at step S104, the first inference model is applied. Subsequently, a description is given of the document with many characters (particularly, characters of a small character size) such as office documents (text document) and academic papers to which the second inference model is applied. Here, it is assumed that an input image as illustrated in FIG. 6C is given. A result of performing the character determination processing on the image data illustrated in FIG. 6C is a binary image as illustrated in FIG. 6D. As illustrated in FIG. 6C, in a case of the image data of the text document including a photograph (or a picture) part, the binary image in which a portion corresponding to the text portion is black as illustrated in FIG. 6D is obtained.

For example, in a case where the processing of the second image processor 160 is to be performed on an input image in which minute characters occupy most of the entire image as in FIG. 6C, a character determination processing result (binary image) as in FIG. 6D is output by the character determination unit 162 (processing at S101).

When the image illustrated in FIG. 6D is input to the top-bottom determination unit 164, the inference model selection unit 166 (processing at S102 to S104) is performed. As the processing at S102 of the inference model selection unit 166, character pixels are counted with respect to the character determination processing result (binary image) as illustrated in FIG. 6D, and it is determined whether a ratio of the counted number of character pixels to the number of pixels of the entire image is a threshold set in advance or larger. This threshold herein is 50%, for example. In the input image illustrated in FIG. 6C, the minute characters occupy most of the entire image. In the character determination processing result illustrated in FIG. 6D, an occupied ratio of the character pixels with respect to the entire image is large, and the number of character pixels is also large (here, for the sake of description, the number of character pixels is 7,000 with respect to the number of pixels of 10,000 in the entire image).

In a case of the input image illustrated in FIG. 6C, since the number of character pixels (7,000 pixels with respect to 10,000 pixels, so that the ratio is 70%) is equal to or larger than the threshold (50%), a determination result in the processing at S102 is YES.

In a case where the determination result of YES is obtained in the processing at step S102, the processing at S103 and S104 is not performed. As described above, in a case where the determination result of YES is obtained in the processing at S102, the second inference model is applied.

FIGS. 7A to 7D illustrate character area cutout processing of the image data performed in the processing at S106 and reduction processing of the image data performed in the processing at S108. As in FIGS. 6A to 6D, for convenience of description, a black frame is attached to the image. In FIGS. 7 and 7, rows of characters are schematically represented by parallel lines. The processing at step S106 and the processing at S108 correspond to preprocessing applied before the input to the first inference model and the second inference model, respectively.

Figure 7A:
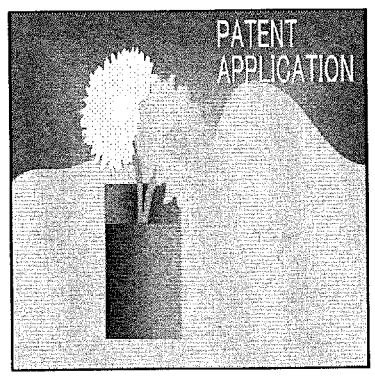
FIGS. 7A to 7D are views for illustrating character area cutout processing of the image data and reduction processing of the image data in according to one embodiment.
Figure 7B:
Figure 7C:
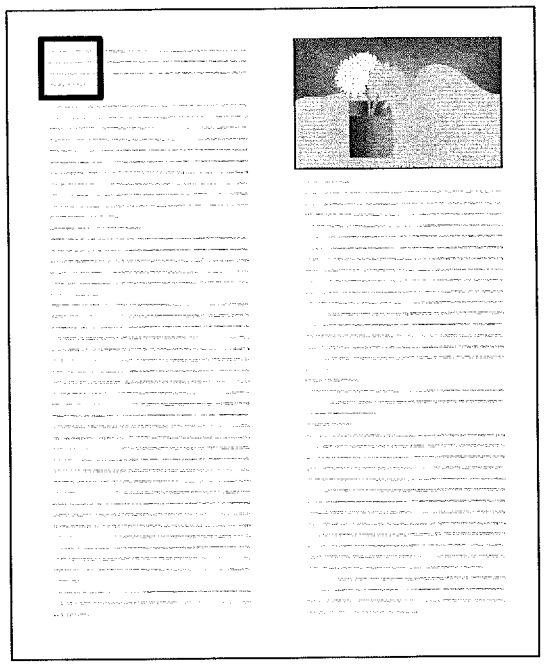

The preprocessing applied to the first inference model 182 is first described. In a case where it is determined that the first inference model is to be applied in the processing up to the inference model selection unit 166 (up to S104), the input image as illustrated in FIG. 6A is input to the reduced image generation unit 172 (processing at S108). As the processing at S108 of the reduced image generation unit 172, the reduction processing is applied to the input image as illustrated in FIG. 6A. In the reduction processing at that time, nearest neighbor interpolation or linear interpolation (bilinear) may be adopted; the scaling down algorithm to be adopted is not limited. It is not limited whether to maintain an aspect ratio of the image before and after the scaling or ignore the same when reducing the image. When the reduction processing at S108 is applied to the input image as illustrated in FIG. 6A, a reduced image as illustrated in FIG. 7A is obtained. The size after the reduction is the image size input to the inference model. The reduced image in FIG. 7A is input to the top-bottom inference unit 178 via the preprocessing combining unit 176, and the inference as the top-bottom determination is performed thereon by the first inference model 182.

The preprocessing applied to the second inference model 184 is next described.

In a case where it is determined that the second inference model 184 is to be applied in the processing up to the inference model selection unit 166 (up to S104), the input image illustrated in FIG. 6C and the character determination processing result illustrated in FIG. 6B of the image data illustrated in FIG. 6D output by the character determination unit 162 (processing at S101) are input to the character area cutout unit 174 (processing at S106).

As the processing at S106 of the character area cutout unit 174, a character area included in a rectangular area of any size is detected for the character determination processing result of the image data illustrated in FIG. 6C as illustrated in FIG. 6D.

Figure 7D:
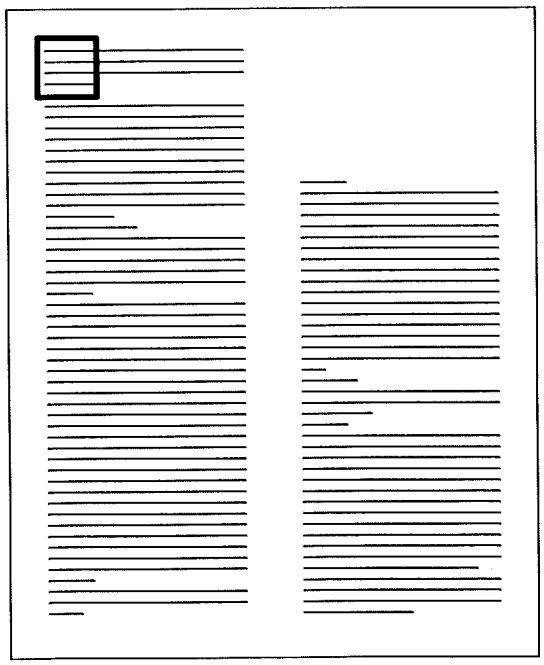

In FIG. 7D, the rectangular area of any size including the character area detected in FIG. 6D is indicated by a black frame. As the processing at step S106, an area of the input image corresponding to the black frame illustrated in FIG. 7D (illustrated in FIG. 7C) is further cut out. The character area cutout image (FIG. 7B) that is cut out is input to the top-bottom inference unit 178 via the preprocessing combining unit 176, and the inference as the top-bottom determination is performed by the second inference model 184.

The embodiments described above provide the image processing apparatus, the image processing method, and the program to determine the orientation of the document that may include a character (text portion) and a portion (e.g., picture) other than a character.

As described above, there is a method for the top-bottom determination technology using the inference model such as the neural network model by the deep learning. The method for the top-bottom determination using a deep learning technology has an advantage for, such as a photograph or illustration (a document without a character) over OCR-based technologies. In contrast, in consideration of consumed memory, it is common to the image size and input the reduced image data to the inference model. The image may be uniformly reduced without preprocessing. In many cases, read data of a rectangular document having a relatively high resolution is scaled down to a square image having a relatively small resolution that matches an input layer of the inference model. In such cases, the more minute the characters written in the document, the more character information is lost at the time of scaling down, and the accuracy of the top-bottom determination is deteriorated.

According to the embodiments described above, a plurality of models is provided, and further, a plurality of preprocessing is prepared. The plurality of preprocessing includes preprocessing in which priority is given to reduction with respect to the model and preprocessing in which priority is given to cutout of a part of an image. Therefore, the model to be preferentially used is switched according to the type of the document. Accordingly, even in a document including many minute characters, the top-bottom determination accuracy is equivalent to that of other types of documents (such as photographs). As compared with the conventional top-bottom determination method using the OCR, accuracy of the top-bottom determination of a document such as a photograph improves, and deterioration in accuracy is suppressed even in the top-bottom determination of a document including a large number of minute characters for which accuracy deterioration is trade-off with consumed memory due to adoption of the deep learning technology. That is, switching the determination processing according to the document type enables the top-bottom determination with high accuracy.

As described above, in one aspect, the document type is determined based on the ratio of the character area in the image and whether the non-character area is flat for each document, and the model is selected according to the document type. With this configuration, preprocessing and an inference model optimal for the document is prepared instead of applying a uniform inference model to all documents, which leads to general improvement in accuracy of the top-bottom determination. Preparing the preprocessing and inference model for each type of the document enables the top-bottom determination with high accuracy on a large number of types of documents. Executing appropriate preprocessing per inference model enables the top-bottom determination with a high degree of freedom, leading to improvement in general accuracy of the top-bottom determination.

The functions described above may be implemented by a computer-executable program described in a legacy programming language such as assembler, C, C++, C#, and Java (registered trademark), an object-oriented programming language or the like, and may be distributed in a manner stored in a device-readable recording medium such as a ROM, an electrically erasable programmable read only memory (EEPROM), an erasable programmable read only memory (EPROM), a flash memory, a flexible disk, a CD-ROM, a CD-ReWritable (CD-RW), a DVD-ROM, a DVD-RAM, a DVD-RW, a Blu-ray disc, a secure digital (SD) card, or a magneto-optic disc (MO), or via an electric communication line.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processing apparatus comprising circuitry configured to:
   determine a type of a document based on a determination result of a character area and a non-character area in an input image of the document, wherein the character area is an area of pixels forming a character among pixels forming an input image, the non-character area is an area of pixels forming an object other than a character among the pixels forming the input image, and the determination result is a result of determination on the area of pixels executed in units of pixels;
   select a model to be used in top-bottom determination in determining a top-bottom orientation of the document, from a plurality of models based on the type of the document, wherein the plurality of models include a first model being an inference model trained on an assumption that an image obtained by reducing the input image, and a second model being an inference model trained on an assumption that an image obtained by cutting out an area including character portions of the input image;
   reduce the input image, to generate a reduced image;
   cut out a part of the input image as a partial image; and
   output a top-bottom determination result of the input image using the selected model and the reduced image or the partial image corresponding to the model.

2. The image processing apparatus according to claim 1, wherein the circuitry determines the type of the document based on at least a ratio of a character area in the input image.

3. The image processing apparatus according to claim 2, wherein, in a case where the ratio of the character area in the input image satisfies a predetermined condition, the circuitry determines the type of the document based on an image feature amount of the non-character area in the input image.

4. The image processing apparatus according to claim 1, wherein each of the plurality of models is an inference model that outputs the top-bottom determination result with respect to the input image.

5. The image processing apparatus according to claim 1, wherein the plurality of models includes:
   a first inference model trained to perform top-bottom determination based on the input reduced image; and
   a second inference model trained to perform top-bottom determination based on the input partial image corresponding to the character area.

6. The image processing apparatus according to claim 1, wherein the circuitry selects the model in a unit of one input image.

7. The image processing apparatus according to claim 1, wherein the circuitry determines the character area and the non-character area in the input image and generates the determination result.

8. An image processing method comprising:
   determining a type of a document based on a determination result of a character area and a non-character area in an input image of the document, wherein the character area is an area of pixels forming a character among pixels forming an input image, the non-character area is an area of pixels forming an object other than a character among the pixels forming the input image, and the determination result is a result of determination on the area of pixels executed in units of pixels;
   selecting a model to be used in top-bottom determination in determining a top-bottom orientation of the document, from a plurality of models based on the type of the document, wherein the plurality of models include a first model being an inference model trained on an assumption that an image obtained by reducing the input image, and a second model being an inference model trained on an assumption that an image obtained by cutting out an area including character portions of the input image; and
   outputting a top-bottom determination result of the input image using the selected model and a reduced image or a partial image corresponding to the model, the reduced image being reduced from the input image, the partial image being cut out from the input image.

9. A non-transitory recording medium storing a plurality of program codes which, when executed by one or more processors, causes the processors to perform a method, the method comprising:
   determining a type of a document based on a determination result of a character area and a non-character area in an input image of the document, wherein the character area is an area of pixels forming a character among pixels forming an input image, the non-character area is an area of pixels forming an object other than a character among the pixels forming the input image, and the determination result is a result of determination on the area of pixels executed in units of pixels;
   selecting a model to be used in top-bottom determination in determining a top-bottom orientation of the document, from a plurality of models based on the type of the document, wherein the plurality of models include a first model being an inference model trained on an assumption that an image obtained by reducing the input image, and a second model being an inference model trained on an assumption that an image obtained by cutting out an area including character portions of the input image; and
   outputting a top-bottom determination result of the input image using the selected model and a reduced image or a partial image corresponding to the model, the reduced image being reduced from the input image, the partial image being cut out from the input image.

* * * * *